United States Patent
Matikainen et al.

(10) Patent No.: US 12,146,019 B2
(45) Date of Patent: Nov. 19, 2024

(54) WASHING PROCESS

(71) Applicant: BOREALIS AG, Vienna (AT)

(72) Inventors: Pasi Matikainen, Porvoo (FI); Emilia Heliseva, Porvoo (FI); Jukka-Pekka Parjanen, Porvoo (FI)

(73) Assignee: Borealis AG, Vienna (AT)

( * ) Notice: Subject to any disclaimer, the term of this patent is extended or adjusted under 35 U.S.C. 154(b) by 754 days.

(21) Appl. No.: 17/413,765

(22) PCT Filed: Nov. 28, 2019

(86) PCT No.: PCT/EP2019/082872
§ 371 (c)(1),
(2) Date: Jun. 14, 2021

(87) PCT Pub. No.: WO2020/109452
PCT Pub. Date: Jun. 4, 2020

(65) Prior Publication Data
US 2022/0177613 A1    Jun. 9, 2022

(30) Foreign Application Priority Data
Nov. 30, 2018  (EP) ..................................... 18209613

(51) Int. Cl.
*B01D 21/26* (2006.01)
*B01J 8/00* (2006.01)
(Continued)

(52) U.S. Cl.
CPC ............ *C08F 4/643* (2013.01); *B01D 21/267* (2013.01); *C08F 10/00* (2013.01)

(58) Field of Classification Search
CPC .............................. B01D 21/267; B01J 8/0055
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |

(Continued)

FOREIGN PATENT DOCUMENTS

| | | |
|---|---|---|
| CN | 102666601 | 9/2012 |
| CN | 102686613 | 9/2012 |

(Continued)

OTHER PUBLICATIONS

International Search Report and Written Opinion issued for Application No. PCT/EP2019/082872, dated Feb. 12, 2020, 13 pages.

*Primary Examiner* — Catherine S Branch
(74) *Attorney, Agent, or Firm* — Meunier Carlin & Curfman LLC

(57) ABSTRACT

A process for washing a particulate substance comprising: (i) combining a particulate substance and a first washing medium in a first vessel to form a slurry and washing the particulate substance with said washing medium; (ii) transferring the slurry to a hydrocyclone; (iii) removing a first by-product stream depleted in particulate substance and a first product stream enriched in particulate substance from the hydrocyclone; (iv) transferring the first product stream to a second vessel and in the presence of a second washing medium forming a slurry and washing the particulate substance with said second washing medium e.g. by agitation thereof; (v) transferring the slurry to a hydrocyclone; (vi) removing a second by-product stream depleted in particulate substance and a second product stream enriched in particulate substance from the hydrocyclone.

19 Claims, 2 Drawing Sheets

Figure 1:
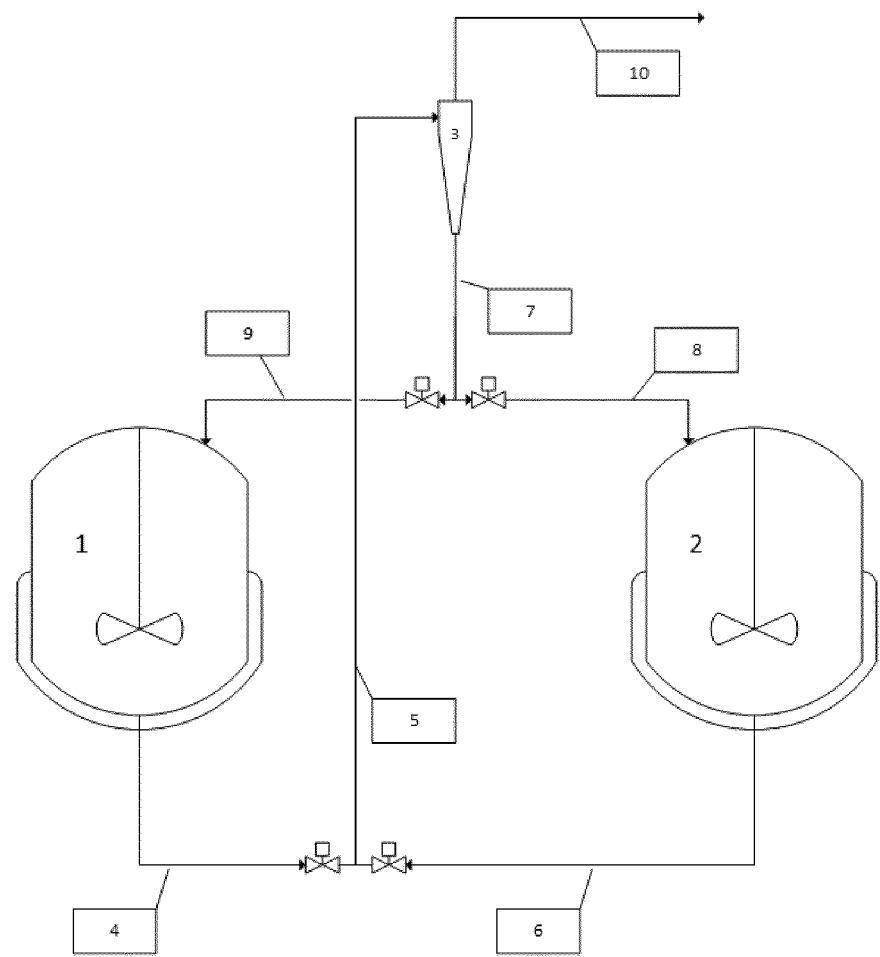

(51) Int. Cl.
*C08F 4/643* (2006.01)
*C08F 10/00* (2006.01)

(56) References Cited

U.S. PATENT DOCUMENTS

| | | | |
|---|---|---|---|
| 4,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 5,215,733 A | 6/1993 | Potter | |
| 5,539,067 A | 7/1996 | Parodi et al. | |
| 5,618,771 A | 4/1997 | Parodi et al. | |

FOREIGN PATENT DOCUMENTS

| | | |
|---|---|---|
| CN | 106554438 A | 4/2017 |
| EP | 0045975 | 4/1989 |
| EP | 0376936 A2 | 7/1990 |
| EP | 0260130 | 11/1993 |
| EP | 0045976 | 12/1993 |
| EP | 0045977 | 3/1995 |
| EP | 0537130 | 9/1996 |
| EP | 0591224 B1 | 2/1998 |
| EP | 0688794 B1 | 8/1998 |
| EP | 0423101 | 1/2000 |
| EP | 0629632 | 10/2000 |
| EP | 1074557 | 2/2001 |
| EP | 0629631 | 8/2002 |
| EP | 0776913 | 2/2004 |
| EP | 0810235 B1 | 11/2004 |
| EP | 1739103 | 1/2007 |
| EP | 1752462 | 3/2009 |
| EP | 2532687 | 12/2012 |
| EP | 1538167 | 11/2015 |
| EP | 3181220 A1 | 6/2017 |
| EP | 2729479 | 9/2017 |
| EP | 2746289 | 9/2017 |
| EP | 2402353 | 4/2018 |
| EP | 2610271 | 3/2019 |
| JP | 2007039529 A | 2/2007 |
| WO | 87/07620 | 12/1987 |
| WO | 92/19653 | 11/1992 |
| WO | 92/19658 | 11/1992 |
| WO | 1992/019659 | 11/1992 |
| WO | 92/21705 | 12/1992 |
| WO | 93/11165 | 6/1993 |
| WO | 93/11166 | 6/1993 |
| WO | 93/19100 | 9/1993 |
| WO | 95/32994 | 5/1995 |
| WO | 97/28170 | 8/1997 |
| WO | 97/36939 | 10/1997 |
| WO | 98/12234 | 3/1998 |
| WO | 98/40331 | 9/1998 |
| WO | 98/46616 | 10/1998 |
| WO | 98/49208 | 11/1998 |
| WO | 98/56831 | 12/1998 |
| WO | 99/12943 | 3/1999 |
| WO | 99/12981 | 3/1999 |
| WO | 99/19335 | 4/1999 |
| WO | 99/33842 | 7/1999 |
| WO | 99/42497 | 8/1999 |
| WO | 1999/051646 | 10/1999 |
| WO | 99/61489 | 12/1999 |
| WO | 00/26266 | 5/2000 |
| WO | 00/34341 | 6/2000 |
| WO | 2001/55230 | 8/2001 |
| WO | 02/002575 | 1/2002 |
| WO | 02/002576 | 1/2002 |
| WO | 03/000755 | 1/2003 |
| WO | 03/000756 | 1/2003 |
| WO | 2003/000754 | 1/2003 |
| WO | 2003/000757 | 1/2003 |
| WO | 03/010208 | 2/2003 |
| WO | 03/051514 | 6/2003 |
| WO | 2003/051934 | 6/2003 |
| WO | 2004/029112 | 4/2004 |
| WO | 2004/085499 | 10/2004 |
| WO | 2005/105863 | 11/2005 |
| WO | 2005/118655 A1 | 12/2005 |
| WO | 2006/097497 | 9/2006 |
| WO | 2007/107448 | 9/2007 |
| WO | 2007/116034 | 10/2007 |
| WO | 2007/137849 | 12/2007 |
| WO | 2007/137853 | 12/2007 |
| WO | 2009/027075 | 3/2009 |
| WO | 2009/054832 | 4/2009 |
| WO | 2012/001052 | 1/2012 |
| WO | 2012/007430 | 1/2012 |
| WO | 2013/098137 | 7/2013 |
| WO | 2013/098149 | 7/2013 |
| WO | 2013098138 | 7/2013 |
| WO | 2014/096296 | 6/2014 |
| WO | 2016/097193 | 6/2016 |

WASHING PROCESS

CROSS-REFERENCE TO RELATED APPLICATIONS

This application is a US national phase application of international patent application No. PCT/EP2019/082872 filed on Nov. 28, 2019, which claims priority to European patent application No. 18209613.1 filed on Nov. 30, 2018, the disclosures of each of which are fully incorporated herein by reference in their entireties.

This invention relates to a new process for washing particulate compositions, in particular solid olefin polymerisation catalyst component particles, using a hydrocyclone. In one embodiment, the invention concerns washing of solid catalyst component particles in a plurality of washing steps using a hydrocyclone. In another embodiment, the invention concerns the separation of solid catalyst component particles from the medium in which they are prepared and from washing media in which these particles are then washed using a hydrocyclone. The process of the invention uses a "pendulum" separation procedure using a hydrocyclone to accelerate the separation processes.

BACKGROUND

The use of solid olefin polymerisation catalysts to prepare polyolefins such as polyethylene and polypropylene is well known. Conventionally, these solid catalysts comprise an external support.

Supported Ziegler—Natta (ZN) catalysts may be based on $MgCl_2$ and contain a titanium compound and optionally a Group 13 compound, typically an aluminium compound. Such catalysts are disclosed, for instance, in EP376936, EP591224, WO 2005/118655 and EP 810235 disclosing e.g. spray-drying or spray-crystallisation methods for producing $MgCl_2$-based support materials. The supported ZN catalyst component may also be prepared by sequentially contacting an inorganic support with compounds of Group 2, like Mg, Group 4 to 6, like Ti, and Group 13, like Al, as described e.g. in EP 688794 and WO 99/51646. Alternatively, a catalyst component may be prepared by first preparing a solution from the catalyst compounds, and then contacting the solution with a support, as described in WO 01/55230.

Still another way to produce solid ZN catalyst components is based on a method, where catalyst component ingredients are reacted in solution. Depending on the preparation conditions, like temperature, an emulsion is formed, wherein the droplets of the dispersed phase are solidified to form solid catalyst component particles. Alternatively, the catalyst solution is precipitated to obtain the solid catalyst particles. Such preparation methods are described e.g. in patent publications WO2003/000757, WO2003/000754, WO2004/029112 WO2007/137849, WO2007/137853, WO2012/007430, WO2013/098149, WO2013/098137 and WO2013098138.

WO03/051934 also discloses a process for the preparation of a solid but carrier free olefin polymerisation catalyst, especially a single site catalyst, based on the formation of a liquid/liquid emulsion system comprising a solution of the catalyst components dispersed in a solvent. The catalyst components are located inside the dispersed droplets within the continuous phase of the emulsion. Solid catalyst component particles are then formed by solidifying said dispersed droplets.

In order to prepare solid catalyst component particles using the above emulsion or precipitation processes on an industrial scale, the inventors have realised that adaptions need to be made to bench scale processes. In particular, adaptions are needed in the method for separating the solid catalyst component particles from the emulsion system from which they have been solidified and in the washing steps that follow that separation. The liquids that remain after catalyst component particle solidification will be called the mother liquor herein.

On bench scale, the solid catalyst component particles can be separated from the mother liquor by allowing the catalyst component particles to settle in the mother liquor and subsequently siphoning or decanting off the liquid.

Solid catalyst component particles, being either supported catalyst particles or prepared by emulsion-solidification or precipitation method are then washed using conventional solvents to remove impurities. The solid olefin polymerisation catalyst component particles do not dissolve in the washing solvent but form a suspension or slurry therein.

Obvious options for separation of the solid olefin polymerisation catalyst component particles from the mother liquor or any washing medium would be filtration. Whilst filtration would be an obvious alternative, filtration isn't an ideal solution due to blocking of the filter and a negative effect on catalyst particle morphology. In particular, the filtration process appears to lead to particle break up or agglomeration.

Alternatively therefore, a settling process has been used. Once the solidification step or washing step is complete, the solid olefin polymerisation catalyst component particles settle in the mother liquor or washing medium and the liquid can be decanted or siphoned away to leave the particles. One problem with the industrial scale preparation is that the settling step takes a lot longer than on bench scale. Whereas a bench scale settling step might be 15 minutes in duration, an industrial scale settling process can take much longer On industrial scale, the long settling time limits the capacity of the catalyst plant.

For example, one washing step consists of following steps: Dosing of the washing medium (such $TiCl_4$ solution, toluene or heptane) to the particles, washing the particles, settling and siphoning off the media. One of these washing steps can take 3 to 4 hours. If there are 6 washings steps the entire washing procedure can last 20 hrs or more.

The present inventors therefore sought a new process for the separation of these solid catalyst component particles from the mother liquor and from the washing media that avoids a prolonged settling step. Enabling faster separation of the solid particles from the mother liquor and the washing medium may lead to an increase in plant capacity. Moreover, shorter separation time might also allow optimization of the washing steps and catalyst quality. In some cases, short contact time between the catalyst and washing media can be beneficial for the catalyst performance.

The present inventors have now found that the above mentioned problem can be solved using a faster separation method. A hydrocyclone has been found to effect the separation of the particles and the mother liquor or washing media in a short period of time, such as within 10 to 30 minutes. Surprisingly, the use of a hydrocyclone is compatible with the desired catalyst component particle sizes, does not lead to catalyst component particle damage and maintains good particle morphology. It might have been expected that a relatively rigorous separation process such as hydrocyclone separation might damage the catalyst component particles in some way, e.g. agglomerate them or break them up, but this is not observed. Particle morphology is maintained.

Hydrocyclones (or just cyclones) are generally used in industry to separate solid particles from gaseous streams and liquid streams. In several industrial applications, hydrocyclones are used in processes to separate used catalyst from a product stream. In EP3181220, a heterogeneous catalyst is removed from a crude reaction product using a hydrocyclone.

It is surprising however, that the hydrocyclone can be used to separate catalyst particles without any detrimental effect on the morphology. Especially it is remarkable that the morphology and particle size of the olefin catalyst component particles prepared by an emulsion-solidification method are not detrimentally effected by the use of hydrocyclone in separation steps. Moreover, on the back of the insight that a hydrocyclone can be used, the present inventors have devised a washing process that is suitable for all manner of particulate substances based on the use of at least two washing vessels and at least one hydrocyclone. The process is based on the use of a first vessel, a hydrocyclone and a second vessel, with slurry from the first vessel being transferred to the hydrocyclone for separation and the product stream transferred to the second vessel for a second washing step. Subsequently, slurry from the second vessel is transferred back to the hydrocyclone and optionally the product stream is transferred back to the first vessel for a third washing step. We call this a "pendulum" process herein.

The first vessel in the process of the invention may also be the one in which the catalyst component particles are formed and hence the first step may involve separation of catalyst component particles from a liquid medium, e.g. a mother liquor, in which the solid particles are slurried or are formed using the hydrocyclone. This separation step is followed by one or more washing steps in which the hydrocyclone is used to separate the particles from the washing medium.

SUMMARY OF INVENTION

Thus, viewed from one aspect the invention provides process for washing a particulate substance comprising:
(i) combining a particulate substance and a first washing medium in a first vessel to form a slurry and washing the particulate substance with said washing medium;
(ii) transferring the slurry to a hydrocyclone;
(iii) removing a first by-product stream depleted in particulate substance and a first product stream enriched in particulate substance from the hydrocyclone;
(iv) transferring the first product stream to a second vessel and, in the presence of a second washing medium, forming a slurry and washing the particulate substance with said second washing medium e.g. by agitation thereof;
(v) transferring the slurry back to the hydrocyclone;
(vi) removing a second by-product stream depleted in particulate substance and a second product stream enriched in particulate substance from the hydrocyclone; optionally
(vii) transferring the second product stream to said first vessel and in the presence of third washing medium forming a slurry and washing the particulate substance with said third washing medium e.g. by agitation thereof;
(viii) transferring the slurry to the hydrocyclone;
(ix) removing a third by-product stream depleted in particulate substance and a third product stream enriched in particulate substance from the hydrocyclone.

Steps (iv) to (vi) or steps (iv) to (ix) can then be repeated as required.

Viewed from another aspect the invention provides a process for separating solid olefin catalyst component particles from a medium in which they are present which process comprises:
(i) providing in a first vessel a slurry of a liquid medium and solid olefin catalyst component particles;
(ii) transferring the slurry into a hydrocyclone;
(iii) removing a first by-product stream depleted in solid olefin polymerization catalyst component particles and a first product stream enriched in solid olefin polymerization catalyst component particles from the hydrocyclone;
(iv) transferring the first product stream to a second vessel and in the presence of a washing medium to form a slurry and washing the solid olefin polymerization catalyst component particles with said washing medium e.g. by agitation thereof;
(v) transferring the slurry back to the hydrocyclone;
(vi) removing a second by-product stream depleted in solid olefin polymerization catalyst component particles and a second product stream enriched in solid olefin polymerization catalyst component particles from the hydrocyclone; optionally
(vii) transferring the second product stream to said first vessel and in the presence of third washing medium forming a slurry and washing the particulate substance with said third washing medium e.g. by agitation thereof;
(viii) transferring the slurry to the hydrocyclone;
(ix) removing a third by-product stream depleted in particulate substance and a third product stream enriched in particulate substance from the hydrocyclone.

Steps (iv) to (vi) or steps (iv) to (ix) can then be repeated as required.

In particular, the hydrocyclone comprises an overhead outlet, e.g. for removal of the by-product stream, a bottom outlet e.g. for removal of the product stream and a separate inlet for supplying the slurry to the hydrocyclone in such a way to create a vortex within the hydrocyclone. Alternatively, the overhead outlet may be for removal of the product stream, and the bottom outlet for removal of the by-product stream.

Viewed from another aspect the invention provides a process for producing solid olefin polymerization catalyst component particles from an emulsion comprising the steps of:
(i) producing in a first vessel an emulsion comprising droplets of a dispersed phase in a continuous phase, the droplets comprising a transition metal compound;
(ii) solidifying the droplets to produce a slurry comprising solid olefin polymerization catalyst component particles in a residual mother liquor;
(iii) transferring the slurry to a hydrocyclone and separating the solid olefin polymerization catalyst component particles from the mother liquor using a hydrocyclone;
(iv) removing a by-product stream depleted in solid olefin polymerization catalyst component particles and a product stream enriched in solid olefin polymerization catalyst component particles from the hydrocyclone;
(v) transferring the product stream to a second vessel and in the presence of a washing medium forming a slurry and washing the particles with a washing medium e.g. by agitation thereof;

(vi) transferring the slurry to the hydrocyclone;
(vii) removing a second by-product stream depleted in solid olefin polymerization catalyst component particles and a second product stream enriched in solid olefin polymerization catalyst component particles from the hydrocyclone.

Again, washing steps can be repeated.

Definitions

The particulate substance comprises a plurality of particles. In case the invention is used in preparation of a catalyst component particles, a volumetric mean particles size may be in the range of 5 to 400 preferably 10 to 200 μm.

The particulate substance is preferably solid olefin catalyst component particles. Said catalyst component particles may comprise an external carrier, i.e. are supported catalyst particles or the catalyst component particles may be in solid form but do not contain an external carrier. By external carrier is meant a support such as silica, $MgCl_2$ or alumina on which a catalyst might be carried. By solid catalyst component free of external carrier is meant a catalyst prepared without adding any external support material, like silica or $MgCl_2$, into the catalyst synthesis, but the solid catalyst is formed during the synthesis of the catalyst. The solid catalyst component particles of the invention are designed for use in heterogeneous polymerisations. Catalysts in heterogeneous polymerisation stay essentially in solid form in the reaction medium under the polymerisation conditions.

The term solid olefin catalyst component particle is used to define an actual catalyst or a precursor thereto. In one embodiment, the solid olefin catalyst component particles might be an actual catalyst, i.e. the particles contain all required catalyst compounds to effect a polymerisation. In another embodiment, the solid olefin catalyst component particles might be combined, in use, with a cocatalyst, and optionally with an external electron donor, which are not part of the solid catalyst component, but fed as separate components to the polymerisation process. The process of the invention allows for the particles to be a final catalyst or a precursor thereto and the term solid olefin catalyst component particles is intended to cover both these embodiments.

In one embodiment, the solid olefin catalyst component particles are the product of the solidification step defined herein.

A hydrocyclone (often referred to by the shortened form cyclone) is a device to classify, separate or sort particles in a liquid suspension based on the ratio of their centripetal force to fluid resistance. This ratio is higher for dense particles and larger particles, and lower for lighter and finer particles.

The hydrocyclone relies on the different density of the contents of the hydrocyclone and imparts centripetal forces or centrifugal forces within a vortex. In operation, a mixture is injected into the hydrocyclone in such a way as to create the vortex and, depending upon the relative densities of the two phases, the centrifugal acceleration will cause the dispersed phase to move away from or towards the central core of the vortex.

A hydrocyclone will normally have a cylindrical section at the top where liquid is fed tangentially, and a conical base. The angle, and hence length of the conical section, plays a role in determining operating characteristics.

The hydrocyclone typically has two exits on the central axis: one on the bottom (underflow or reject) and one at the top (overflow or accept). The underflow exit is generally for the denser or coarser fraction, while the overflow is the lighter or finer fraction. It has no moving parts and its operation depends on the injection characteristics of the feed stream and the geometry of the cyclone.

In operation, inertia is countered by the resistance of the liquid, with the effect that larger or denser particles are transported to the wall for eventual exit at the underflow side with a limited amount of liquid, while the less dense liquid exits at the overflow side through a tube which typically extends slightly into the cylindrical body of the cyclone at the centre.

Hydrocyclones are mostly made of steel, ceramic or plastic (such as polyurethane, polypropylene, or other types).

Hydrocyclones are related to centrifuges but are not the same. Centrifuges generate the separation force by rotation of the entire equipment; hydrocyclones utilise centrifugal forces caused during injection to create a vortex. Separation occurs from the movement of the fluids to achieve separation.

In all embodiments of the invention, it is preferred if a single hydrocyclone is used. The use of a single hydrocyclone can be combined with the other embodiments described herein.

DETAILED DESCRIPTION OF INVENTION

The present invention provides a new process for washing a particulate substance, in particular solid olefin polymerization catalyst component particles. Alternatively, the invention provides a process in which a particulate substance is separated from the medium in which it is prepared and is subsequently washed. In both embodiments, a pendulum process using a hydrocyclone is employed to separate the liquid medium from the particulate substance.

Surprisingly, the use of a hydrocyclone has been found to accelerate the washing and separation processes. Moreover, when the particulate substance comprises solid olefin polymerisation catalyst component particles, the process of the invention allows the isolation of the particulate substance with retained catalyst morphology, in high yield and ideal particle size.

In one embodiment, the invention relates to the washing of particulate substances in multiple washing steps using a pendulum process to accelerate the washing process. Thus, the present invention includes the implementation of a cyclone operation to wash particulate substances, in particular solid olefin polymerisation catalyst component particles, more specifically Ziegler Natta catalyst component particles in multiple washing steps using a pendulum process.

The use of the hydrocyclone allows a general reduction in the time required for washing steps. Shorter washing time allows optimisation of the catalyst properties by adjusting the contact time of the catalyst in different washing steps.

In a second embodiment, invention relates to the preparation of a particulate substance in a liquid medium, separation of the particulate substance from that liquid medium using a hydrocyclone and washing of the particulate substance using a pendulum process to accelerate the process. Thus, the present invention includes the implementation of a cyclone operation to separate then wash particulate substances, in particular olefin polymerisation catalyst component particles, more specifically Ziegler Natta catalyst component particles in multiple washing steps.

Washing Process

In a first embodiment, the invention concerns a process in which multiple washing steps are carried out using a "pendulum process". The process preferably involves a single hydrocyclone connected to two vessels, such as two stirred tank reactors, in which washing can take place. Whilst it is possible to use more than two vessels or more than one hydrocyclone, this is not preferred. Ideally, the process uses 2 vessels and one hydrocyclone only.

The washing medium can be any suitable washing medium and is not limited. It is a function of the nature of the particulate substance. Typical washing media are well known organic solvents such as aromatic or aliphatic solvents. The nature of the washing medium will depend on the nature of the particulate substance being washed. For e.g. ZN catalyst components an aromatic or aliphatic hydrocarbon washing medium, preferably toluene, benzene, aliphatic hydrocarbon of 5 to 9 C-atoms, such as pentane, hexane or heptane or mixtures thereof are ideal. In addition $TiCl_4$ may be used alone or as a mixture with the hydrocarbons as a washing medium. The washing medium should remain as a liquid at the temperature and pressure under which the washing step is carried out. The washing medium may contain also other chemicals suitable for catalysts, e.g. Al compounds, internal electron donors etc.

In a preferred embodiment, the particulate substance comprises solid olefin polymerisation catalyst component particles. Those particles may comprise a catalyst support or the particles may be in solid form, but without any external support material added to the catalyst preparation process.

A first process requires the use of two washing vessels and a hydrocyclone. In a first washing vessel, the particulate substance is washed in the presence of a first washing medium. The combination of washing medium and particulate substance creates a slurry. The washing process may be encouraged by stirring of the slurry. It is also possible to operate the washing process under pressure and/or at elevated temperature.

The washing medium may be present in the first vessel when the particulate substance is added, it may be added simultaneously with the particulate substance or may be added subsequently. In one embodiment, the washing medium is added before the particulate substance in order to allow for the washing medium to be heated to the desired temperature before the particulate substance is added.

The particulate substance may be fed to the vessel at a level above the top of heated washing medium in any vessel or alternatively, the particulate substance is preferably fed to the vessel below the top of the heated washing medium in any reactor.

Any washing step of the invention may be carried out at a temperature of 20 to 120° C., such as 40 to 100° C. depending on the material to be washed and on the washing medium.

Once washing is complete, the slurry is transferred to a hydrocyclone to separate the particulate substance from the washing medium.

Hydrocyclones of the invention preferably comprise an upper cylindrical section and a lower conical section. The slurry enters through an inlet which is typically positioned in the cylindrical portion of the hydrocyclone. The slurry enters the hydrocyclone in such a way that a vortex is generated, i.e. tangentially. The flow pattern in a hydrocyclone is cyclonic. This is induced by tangential injection of the feed into the cylindrical chamber, which causes the development of a vortex. The chamber has a restricted axial bottom outlet such that all of the liquid in the vortex cannot escape via this outlet. Some of the liquid has to reverse its path and flow counter currently to an axial top outlet.

The hydrocyclone comprises an outlet for removal of the by-product stream, an outlet for removal of the product stream and a separate inlet for supplying the slurry to the hydrocyclone in such a way to create a vortex within the hydrocyclone.

The by-product stream is removed via an overhead outlet with removal of the product stream via a bottom outlet, if the by-product stream has a lower density than said product stream. The by-product stream is removed via a bottom outlet and the product stream removed via an overhead outlet, if the by-product stream has a higher density than the product stream.

The density difference between the solid and liquid components to be separated in the hydrocyclone is in the range of 0.2 to 2.0 $g/dm^3$.

From the hydrocyclone, a stream depleted of particulate substance is removed and a stream enriched in particulate substance is removed. Typically, the stream enriched in particulate substance is still a slurry containing, however, a much lower amount of liquid.

The temperature of the slurry within the hydrocyclone can be adjusted as required. It is preferred if the slurry entering the hydrocyclone is at a temperature of 10 to 150° C., typically in the range of 25 to 100° C. It is also preferred if the feed to the hydrocyclone used according to the present invention is under pressure in order to create the necessary vortex. Feed pressures are preferably 2 to 10 bars, such as 2 to 8 bars, like 3 to 6 bars. It is preferred if the pressure difference between the inlet and outlets of the hydrocyclone, is in the range of 0.5 to 5 bar, preferably 2 to 5 bar.

In the hydrocyclone, the particles are separated from the washing medium.

The amount of particles in the stream depleted is preferably in the range from 0 to 2.0 wt % and particularly in the range from 0.05 to 1.5 wt %.

The stream enriched in particles preferably also has a temperature in the range from 10 to 150° C., particularly in the range from 25 to 100° C. The amount of particles in this stream is preferably is in the range from 4 to 20 wt % and particularly in the range from 7 to 15 wt %. If any washing medium is present this can be removed by evaporation, filtration or is removed by diluting it during the following washing steps.

The hydrocyclone which is used in connection with the present invention preferably is dimensioned such that a defined cut size is reached. The cut size is the particle size for which 50% of the particles would leave the hydrocyclone through the overflow (product stream depleted of catalyst) and 50% of the particles leave the hydrocyclone through the underflow (product stream enriched in catalyst). The cut size can be adjusted to make sure that the collected particles have a particular minimum or maximum diameter. A preferred cut size is 5 to 50 µm, preferably 5 to 40 µm, more preferably 10 to 20 µm.

Depending on the flow rate to be processed it is possible to use one or more hydrocyclones. When more than one hydrocyclone is used, the hydrocyclones are connected in parallel.

The particulate substance removed from the hydrocyclone, optionally together with any residual first washing medium, is passed to a second washing vessel and in the presence of a second washing medium, a second washing step is carried out. Again, a slurry is formed between the particulate substance and the washing medium.

The washing medium may be present in the second vessel when the particulate substance is added, it may be added simultaneously with the particulate substance or may be added subsequently. In one embodiment, the washing medium is added before the particulate substance in order to allow for the washing medium to be heated before the particulate substance is added. This allows the washing medium to be heated to a desired washing temperature whilst the first washing step and hydrocyclone separation step are taking place. This speeds up the washing process.

The second washing step may involve the same or different washing medium as the first step. The types of washing medium are governed by the nature of the particulate substance and are typically selected from the same options above in connection with the first washing step.

The particulate substance is preferably fed to the vessel at a level above the top of heated washing medium in the reactor or alternatively, the particulate substance is preferably fed to the vessel below the top of the heated washing medium in the reactor.

After washing, this second slurry can then be transferred back to the hydrocyclone for separation following protocols above. The particulate substance obtained from the hydrocyclone can then, if required be transferred back to the first vessel (or in theory a third vessel) for a further washing step. That washing step can be carried out analoguously to washing step 1. Advantageously, the first washing vessel can contain a third washing medium (which can be the same or different to any washing medium used in the first or second washing steps). Again, the third washing medium can advantageously be supplied to the first washing vessel (or third vessel) before the particulate substance and heated to a desired temperature, e.g. whilst the second washing step is carried out.

The slurry from the third washing step can be transferred back to the hydrocyclone for separation. There might be 2, 3, 4 or 5 (or "n") washing steps, e.g. 4 to 7 washing steps.

This pendulum type washing process can be continued, cycling between vessels 1 and 2 until all washing steps have been completed. It is envisaged that this pendulum washing separation method is generally applicable to a broad range of washing/separation scenarios. Whilst the present inventors have concentrated on the separation of solid olefin polymerization catalyst component particles, this process is applicable to any process that involves the separation of a particulate from a washing medium, especially where filtration is not a viable option.

Separation and Washing Option

In a second embodiment, the invention relates to the use of the "pendulum" process to first separate the particulate substance from the medium in which the particulate substance is prepared followed by at least one washing process as hereinbefore defined. The process preferably involves a single hydrocyclone connected to two vessels, such as two stirred tank reactors, in which washing can take place. Whilst it is possible to use more than two vessels or more than one hydrocyclone, this is not preferred.

The particulate substance in this second embodiment is ideally solid olefin catalyst component particles. The definitions below apply to all embodiments of the invention.

Solid Olefin Catalyst Component Particles

The solid olefin catalyst component particles used in the invention may be Ziegler Natta (ZN) catalyst component particles or single site catalyst component particles. Ziegler-Natta catalyst component particles comprises a solid component comprising a compound of a transition metal of Group 4 to 10, or of a lanthanide or actinide, preferably of transition metal of Group 4 to 6 of IUPAC, and a Group 2 metal compound.

In addition to the solid catalyst component, cocatalyst(s) and optionally external donor(s) are typically used in the polymerisation process.

The solid ZN catalyst component particles may also comprise an electron donor (internal electron donor) and optionally a compound of Group 13 metal, preferably an aluminum compound, like chlorine containing aluminum alkyl.

Suitable internal electron donors are, among others, esters of carboxylic acids or dicarboxylic acids, like phthalates, maleates, substituted maleates, benzoates, and succinates, ethers and diethers, amines, ketones, alcohols, anhydrides or nitriles or oxygen or nitrogen containing silicon compounds, or mixtures thereof.

The Group 2 metal compound is preferably a Mg compound.

The transition metal compound of Group 4 to 6 is preferably a titanium or vanadium compound, more preferably a halogen containing titanium compound, most preferably chlorine containing titanium compound, especially titanium tetrachloride.

The catalyst can be supported on a carrier or is. free of carrier. In one embodiment, the catalyst component particles are solid and are supported on a conventional particulate support. The particulate support material used is preferably an inorganic oxide, like silica or alumina, titania, silica-alumina, silica-titania, or magnesium halide may form the solid support. Preferably, the support is silica or $MgCl_2$ based support.

Before loading, the particulate silica support material is preferably calcined, i.e. heat treated, preferably under a non-reactive gas such as nitrogen. This treatment is preferably at a temperature in excess of 100° C., more preferably 200° C. or higher, e.g. 200-800° C., particularly about 300° C. The calcination treatment is preferably effected for several hours, e.g. 2 to 30 hours, more preferably about 10 hours.

The active metal (i.e. the metal of the catalyst) is preferably loaded onto the support material at from 0.1 to 4%, preferably 0.5 to 3.0%, especially 1.0 to 2.0%, by weight metal relative to the dry weight of the support material.

The supported catalyst can be prepared by sequentially contacting the carrier with the above mentioned compounds. Alternatively, it can be prepared by first preparing a solution from the components and then contacting the solution with a carrier.

Suitable solvents for the loading procedure include organic solvents such as aliphatic and aromatic hydrocarbon solvents. Toluene is a preferred option.

Once the catalyst components have been loaded onto the solid particles, the particles need to be separated from the liquid medium in which they were slurried. This step can occur immediately after loading or after one or more washing steps are effected. It is preferred to effect separation of the supported solid particles and then wash the supported solid particles. The pendulum process of the invention can be adapted to all these options.

If a washing step is effected before the separation then the slurry that is transferred to the hydrocyclone may comprise washing solvent in addition to any liquids used in the catalyst preparation process.

The slurry of supported catalyst particles and liquid medium, like a mother liquor is transferred to the hydrocyclone. Hydrocyclones of the invention are described above and preferred embodiments defined in that section apply here too.

A preferred Ziegler-Natta (ZN) catalyst contains a titanium compound together with a magnesium halide compound acting as a support. Thus, the catalyst contains a titanium compound and optionally a Group 13 compound, for example an aluminium compound on a magnesium dihalide, like magnesium dichloride.

Solid ZN catalyst components may also be formed without using any external support material, like silica, alumina or separately prepared $MgCl_2$ based solid support, onto which catalyst components are loaded. Instead, a solid catalyst may be formed by a method where all catalyst compounds are contacted and/or reacted in liquid with each other, and after that the solid catalyst is formed. The solid catalyst particles are formed via an emulsion-solidification or via a precipitation method.

In the method, where solid catalyst component particles are formed via emulsion-solidification method, the dispersed phase in the form of liquid droplets of the emulsion forms the catalyst part, which is transformed to solid catalyst component particles during a solidification step.

The cocatalyst for a ZN catalyst typically comprises a compound of group 13 metal, typically an aluminum compound, such as aluminum alkyl or aluminum alkyl halide compound.

Suitable external electron donors used especially in propylene polymerisation are well known in the art and include ethers, ketones, amines, alcohols, phenols, phosphines and silanes. Silane type external donors are typically organosilane compounds containing Si—OCOR, Si—OR, or Si—$NR_2$ bonds, having silicon as the central atom, and R is an alkyl, alkenyl, aryl, arylalkyl or cycloalkyl with 1-20 carbon atoms are known in the art.

Examples of suitable ZN catalysts and catalyst components are disclosed among others, in WO 87/07620, WO 92/21705, WO 93/11165, WO 93/11166, WO 93/19100, WO 97/36939, WO 98/12234, WO 99/33842, WO 03/000756, WO 03/000757, WO 03/000754, WO 03/000755, WO 2004/029112, EP 2610271, WO 2012/007430. WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882, EP 688794 or WO 99/51646, WO 01/55230, WO 2005/118655, EP 810235, WO2014/096296 and WO2016/097193.

The solid catalyst component particles prepared by emulsion-solidification method are in the form of spherical particles with a low surface area. Further, these catalysts particles may feature a uniform distribution of catalytically active sites thorough the catalyst particles.

Preferably, no phthalic compounds are used in the catalyst preparation. Thus, the catalyst is free of any undesired phthalic compounds, like phthalates, which have been typically used as internal electron donors. Instead, as internal electron donors are used non-phthalic compounds.

The catalyst component in the form of a solid particulate free of phthalic electron donors and free of external support material is obtainable by the following general procedure:

a) providing a solution of a Group 2 metal alkoxy compound (Ax);

b) providing a solution of at least one compound of a transition metal of Group 4 to 10, or of a lanthanide or actinide, preferably of transition metal of Group 4 to 6;

c) combining solutions from step a) and step b);

d) obtaining the solid catalyst component particles, wherein a non-phthalic internal electron donor (ID) is added at any step prior to step c).

The procedure in more detail with some alternative steps is as follows:

a) providing a solution of $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium where R is a C1-16 hydrocarbyl group such as an C2-16 alkyl group; or $a_3$) a mixture of the Group 2 metal alkoxy compound (Ax) and a Group 2 metal alkoxy compound (Bx) being the reaction product of a Group 2 metal compound and the monohydric alcohol (B) of formula ROH, optionally in an organic liquid reaction medium; or $a_4$) a Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m \leq 2$, provided that both n and m are not simultaneously zero, $0 < n' \leq 2$ and $0 < m' \leq 2$;

b) providing a solution of at least one compound of a transition metal of Group 4 to 10, or of a lanthanide or actinide, preferably of transition metal of Group 4 to 6, c) combining solutions from step a) and step b), d) obtaining the solid catalyst component particles, wherein a non-phthalic internal electron donor (ID) is added at any step prior to step c).

The internal donor (ID) or precursor thereof is added preferably to the solution of step a) or to the solution of a transition metal compound of step b) or after completing step c). Thus, all catalyst compounds are preferably contacted in solution form before the solid particles are formed.

According to the procedure above the solid catalyst can be obtained via precipitation method or via emulsion-solidification method depending on the physical conditions, especially on the temperature used in steps c) and d). Emulsion is also called liquid/liquid two-phase system.

In both methods (precipitation or emulsion-solidification) the catalyst chemistry is the same.

In the precipitation method step c) is carried out and the whole reaction mixture is kept at least at 50° C., more preferably in the temperature range of 55 to 110° C., more preferably in the range of 70 to 100° C., to secure full precipitation of the catalyst component in form of a solid particles (step d).

In the emulsion-solidification method step c), i.e. adding the solution of step a) to the solution of step b) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step d) of the droplets is suitably carried out by heating the emulsion to a temperature of 70 to 150° C., preferably to 80 to 110° C.

The Group 2 metal alkoxy compounds (Ax), (Ax') and (Bx), preferably magnesium alkoxy compounds, can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds ($a_4$)) and used as such in the catalyst preparation process of the invention.

In a preferred embodiment in step a) the solution of $a_2$) or $a_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides or a mixture thereof or with magnesium dihalide. Further, magnesium dialkoxides, magnesium diaryloxides, magnesium aryloxyhalides, magnesium aryloxides and magnesium alkyl aryloxides can be used. Alkyl groups can be similar or different $C_1$-$C_{20}$ alkyls, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, still more preferably 5 to 9 carbon atoms or mixtures thereof. Suitable solvents include benzene, toluene, cumene, xylol, pentane, hexane, heptane, octane and nonane. Toluene, heptane and pentane are particular preferred.

The reaction for the preparation of the magnesium alkoxy compound may be carried out at a temperature of 0° to 80° C., preferably at a temperature of 20° to 70° C. Most suitable temperature is selected depending on the Mg compound and alcohol(s) used.

The transition metal compound is preferably a compound of a Group 4 to 6 metal, is more preferably a titanium compound, most preferably a titanium halide, like $TiCl_4$.

The internal donor (ID) used in the preparation of the catalyst used in the present invention is preferably selected from (di)esters of non-phthalic carboxylic (di)acids, ethers, 1,3-diethers, derivatives and mixtures thereof. Preferred ethers are of 2 to 20 carbon-atoms and especially mono, di or multicyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl)propane, 2,2-di-(2-furan)-propane, or isomers or mixtures thereof.

Another group of preferred donors are in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. Preferred examples are e.g. substituted maleates, like citraconates, most preferably citraconates, especially di-2-ethylhexyl citraconate, and di-cyclic ethers, like 2,2-di (2-tetrahydrofuryl)propane, 2,2-di-(2-furan)-propane, or isomers or mixtures thereof.

In the emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least three times, more preferably at least five times with aromatic and/or aliphatic hydrocarbons, preferably with toluene, heptane or pentane and/or with $TiCl_4$. Washing solutions can also contain donors and/or compounds of Group 13, like trialkyl aluminum, halogenated alkyl aluminum compounds, alkyl alkoxy aluminum compounds or halogenated alkyl alkoxy aluminum compounds. Aluminum compounds can also be added during the catalyst synthesis.

The solid catalyst particle components can then be separated from the mother liquor using a hydrocyclone.

The finally obtained solid Ziegler-Natta catalyst component is desirably in the form of solid particles having generally a volumetric mean particle size in the range of 5 to 200 µm, preferably in the range of 10 to 100 µm. Particles produced by emulsion-solidification method have a surface area below 20 g/m$^2$, more preferably below 10 g/m$^2$, or even below 5 m$^2$/g, which is typically below a detection limit of a BET measurement method. Typically, the amount of Ti is 1 to 6 wt-%, Mg 10 to 20 wt-% and of donor 5 to 40 wt-% in the solid catalyst component.

Cocatalyst

The catalyst may also comprise a cocatalyst being typically an aluminium trialkyl or aluminium alkyl halide compound, wherein alkyl groups typically contain 1 to 20 C-atoms, e.g. 1 to 10 C-atoms. The aluminium alkyl compound is preferably trialkyl aluminium such as trimethylaluminium, triethylaluminium, tri-isobutylaluminium or tri-n-octylaluminium or dialkylaluminium halide, alkyl aluminium dihalide or alkyl aluminium sesquihalide, such as diethylaluminium chloride, dimethylaluminium chloride, ethylaluminium dichloride or ethylaluminium sesquichloride.

External Electron Donors

The catalyst may also comprise an external electron donor. Suitable electron donors known in the art include ethers, ketones, amines, alcohols, phenols, phosphines and silanes. Examples of these compounds are given, among others, in WO 95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882.

External electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art and commonly used especially in propylene polymerisation processes. Such compounds are described in U.S. Pat. Nos. 4,472,524, 4,522,930, 4,560,671, 4,581,342, 4,657,882, EP 45976, EP 45977 and EP1538167.

It is especially preferred to use silanes selected from compounds of the general formula $$R^a{}_p R^b{}_q Si(OR^c)_{(4-p-q)}$$

wherein $R^a$, $R^b$ and $R^c$ denote a hydrocarbyl radical, in particular an alkyl or cycloalkyl group, and wherein p and q are numbers ranging from 0 to 3 with the sum p+q being equal to or less than 3. $R^a$, $R^b$ and $R^c$ can be chosen independently from one another and are linear, branched or cyclic hydrocarbyl groups having 1 to 12 carbon atoms, preferably $R^a$, $R^b$ and $R^c$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, or selected from silanes of general formula $$Si(OCH_2CH_3)_3(NR^3R^4)$$

wherein $R^3$ and $R^4$ can be the same or different a represent a linear, branched or cyclic hydrocarbon group having 1 to 12 carbon atoms, preferably $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

Most preferably as external donors are used silanes selected from (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

A suitable ratio between the co-catalyst (Co) and the external donor (ED) [Co/ED] and/or the ratio between the co-catalyst (Co) and the transition metal (TM) [Co/TM] should be carefully chosen for each process.

Emulsion solidification is the preferred method. In more detail, in the emulsification stage an emulsion is formed. The emulsion comprises a dispersed phase which is in the form of droplets in a continuous phase. The emulsification stage may be operated either batch-wise or continuously.

Single Site Catalysts

According to another embodiment the catalyst is a single site catalyst, preferably metallocene catalyst. Such catalysts comprise a transition metal compound comprising at least one cyclopentadienyl, indenyl or fluorenyl ligand. Preferably the catalyst contains two bridged cyclopentadienyl, indenyl or fluorenyl ligands. Further, the ligands may have substituents, such as alkyl groups, aryl groups, arylalkyl groups, alkylaryl groups, silyl groups, siloxy groups, alkoxy groups or other heteroatom groups.

The organometallic compound (C) comprises a transition metal (M) of Group 3 to 10 of the Periodic Table (IUPAC 2007) or of an actinide or lanthanide.

The term "an organometallic compound (C)" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound (C) has the following formula (I):

$$(L)_m R_n MX_q \qquad (I)$$

wherein
"M" is a transition metal (M) transition metal (M) of Group 3 to 10 of the Periodic Table (IUPAC 2007),
each "X" is independently a monoanionic ligand, such as a σ-ligand,
each "L" is independently an organic ligand which coordinates to the transition metal "M",
"R" is a bridging group linking said organic ligands (L),
"m" is 1, 2 or 3, preferably 2
"n" is 0, 1 or 2, preferably 1,
"q" is 1, 2 or 3, preferably 2 and
m+q is equal to the valency of the transition metal (M).
"M" is preferably selected from the group consisting of zirconium (Zr), hafnium (Hf), or titanium (Ti), more preferably selected from the group consisting of zirconium (Zr) and hafnium (Hf).

In a more preferred definition, each organic ligand (L) is independently
(a) a substituted or unsubstituted cyclopentadienyl or a bi- or multicyclic derivative of a cyclopentadienyl which optionally bear further substituents and/or one or more hetero ring atoms from a Group 13 to 16 of the Periodic Table (IUPAC); or
(b) an acyclic $\eta^1$- to $\eta^4$- or $\eta^6$-ligand composed of atoms from Groups 13 to 16 of the Periodic Table, and in which the open chain ligand may be fused with one or two, preferably two, aromatic or non-aromatic rings and/or bear further substituents; or
(c) a cyclic $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, such ring systems containing optionally one or more heteroatoms selected from Groups 15 and 16 of the Periodic Table.

More preferably at least one of the organic ligands (L), preferably both organic ligands (L), is (are) selected from the group consisting of cyclopentadienyl, indenyl, tetrahydroindenyl, fluorenyl, which can be independently substituted or unsubstituted.

Further, in case the organic ligands (L) are substituted it is preferred that at least one organic ligand (L), preferably both organic ligands (L), comprise one or more substituents independently selected from C$_1$ to C$_{20}$ hydrocarbyl or silyl groups, which optionally contain one or more heteroatoms selected from groups 14 to 16 and/or are optionally substituted by halogen atom(s).

By "σ-ligand" is meant throughout the invention a group bonded to the transition metal (M) via a sigma bond.

Further, the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

The bridging group "R" may be a divalent bridge, preferably selected from —R'$_2$C—, —R'$_2$C—CR'$_2$—, —R'$_2$Si—, —R'$_2$Si—Si R'$_2$—, —R'$_2$Ge—, wherein each R' is independently a hydrogen atom, $C_1$ to $C_{20}$ alkyl, $C_2$ to $C_{10}$ cycloalkyl, tri($C_1$-$C_{20}$-alkyl)silyl, $C_6$-$C_{20}$-aryl, $C_7$-$C_{20}$ arylalkyl and $C_7$-$C_2$O-alkylaryl.

Metallocenes and metallocene catalysts are described in numerous patents. In the following a few examples are listed; EP 629631, EP 629632, WO 00/26266, WO 02/002576, WO 02/002575, WO 99/12943, WO 98/40331, EP 776913, EP 1074557, WO 99/42497, EP2402353, EP2729479, EP2746289, EP 260 130, WO 97/28170, WO 98/46616, WO 98/49208, WO 99/12981, WO 99/19335, WO 98/56831, WO 00/34341, WO00/148034, EP 423 101, EP 537 130, WO2005/105863, WO 2006097497, WO2007/116034, WO2007/107448, WO2009/027075, WO2009/054832, WO 2012/001052, WO99/61489, WO03/010208, WO03/051934, WO03/051514, WO2004/085499, EP1752462, EP1739103 and EP 2532687 the disclosures of which are incorporated herein by reference. Further, metallocenes are described widely in academic and scientific articles.

Single site catalysts in solid form are typically supported on a particulate support, such as inorganic oxide, typically silica or alumina, or they may be prepared by emulsion-solidification method. In the emulsion, the catalyst components are in the droplets of the dispersed phase immiscible with the continuous phase. Said droplets are solidified to form solid catalyst component. The method is described e.g. in WO03/051934.

In order to form the two phase liquid system, the solution of the catalyst component (s) and the solvent used as the continuous liquid phase have to be essentially immiscible at least during the dispersing step. This can be achieved by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon. Such a solvent can thus be used to facilitate the emulsion formation, and usually does not form part of the solidified particles, but e.g. is removed after the solidification step together with the continuous phase.

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

Solidification takes place essentially after the droplets are formed, i.e. the solidification is effected within the droplets.

The term "emulsion" used herein covers both bi- and multiphasic systems.

In another embodiment said solvent forming the continuous phase is an inert solvent including a halogenated organic solvent or mixtures thereof, preferably fluorinated organic solvents and particularly semi, highly or perfluorinated organic solvents and functionalised derivatives thereof.

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), like halogenated hydrocarbons, such as semi- or highly fluorinated hydrocarbons optionally having a functional group(s). The surfactants can be added to the catalyst solution, which forms the dispersed phase of the emulsion, to facilitate the forming of the emulsion and to stabilize the emulsion.

The catalyst component particles are obtained after solidifying said droplets of the dispersed phase. The solidification can be done, for instance, by heating. Preferably the temperature at the solidification stage is from 70° C. to 150° C., more preferably form 70° C. to 110° C. and especially preferably from 90° C. to 110° C.

Activators

Metallocene catalyst is used together with an activator, which may also called as cocatalysts. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO). In addition boron containing compounds may be used as activators.

The hydrocyclone can be used to separate the supported solid polymerisation catalyst component particles or solid polymerisation catalyst component particles being free of external support material from the medium in which they are slurried and/or produced.

After the separation, the solid particles are washed with a washing medium, preferably a hydrocarbon as defined above, such as toluene, pentane, hexane or heptane, suitably heptane or mixtures thereof. It is also possible to wash with a solution of titanium tetrachloride as such or as a mixture with a hydrocarbon, when the target catalyst is a Ziegler Natta catalyst. The hydrocyclone is then used to separate the particles from the washing medium.

Conventionally, one problem with these washing steps is that each time, settling of the catalyst particles has to occur to allow separation of the particles from the washing medium. This is time consuming. The invention therefore relates to the use of a hydrocyclone to separate the catalyst component particles from washing medium. When the catalyst component particles are washed in the washing medium, the particles do not dissolve. Rather, a slurry is formed which conventionally has been allowed to settle in order to separate the particles from the washing solvent. In our invention this is passed back to the hydrocyclone.

This washing process can be repeated as many times as necessary depending on the washing regime desired with the hydrocyclone being used for one or more (such as all) of the post washing separation steps. Washing steps are described above and the same processes apply here.

Crucially, the use of the hydrocyclone speeds up each washing step considerably making the overall time from preparation by any methods as described above to ready catalyst much shorter than if settling and siphoning is used to isolate the target solid olefin catalyst component.

The solid olefin polymerization catalyst component particles are preferably washed at least twice and a "pendulum" separation technique is used to separate the solid olefin polymerization catalyst component particles in the hydrocyclone.

In one embodiment, a hydrocylone is installed between two (preferably identical) vessels, such as stirred tank reactors.

In a more preferred embodiment, solid catalyst component particles are prepared in the first reactor. At the same time, washing medium is dosed to the second reactor and heated up to the washing temperature. Once the appropriate temperature is achieved, the solid catalyst component particles from reactor 1 are separated from the mother liquor by feeding through the hydrocyclone. The concentrated product stream from the hydrocyclone is then fed to reactor 2. By-product flow is directed to waste or to recovery.

Product flow from the hydrocyclone is a concentrated solid catalyst component particle slurry which is fed to the reactor containing the heated up washing media.

After washing time is over in reactor 2, the slurry is concentrated again by feeding it through the hydrocyclone. The product stream from the hydrocyclone can then be passed to the first vessel for further washing if required.

Without wishing to be limited by theory, separation time for each step was roughly 10 to 30 minutes which is significantly faster than settling and siphoning that takes at least 2 hours.

In fact, heating of the washing media may become the rate limiting step in the washing sequence using this technique. The washing liquid is often heated to 50-80° C. and that can take 30 mins or more given the volumes involved.

With this concept, the washing medium can be heated whilst a first separation is taking place. In this way, one washing step can take 30-45 minutes thus the total time for six washes was 4 hours, a considerable reduction on current processes.

There are numerous benefits of the hydrocyclone pendulum concept. The time required for washing steps can be shortened significantly. Shorter washing time allows optimisation of the catalyst properties by adjusting the contact time of the catalyst in different washing steps. Separation split % can be optimized for each washing step.

Filtration of the washing liquids is not needed and hence problem filters could be removed from the process design.

Once the washing steps are complete, the washed particles can be dried or the particles can be slurried into an oil and used as a catalyst-oil slurry in polymerisation process.

Thus, viewed from another aspect the invention provides a process for producing solid olefin polymerization catalyst component particles from an emulsion comprising the steps of:
(i) producing in a first vessel an emulsion comprising droplets of a dispersed phase in a continuous phase, the droplets comprising a transition metal compound;
(ii) solidifying the droplets to produce a slurry comprising solid olefin polymerization catalyst component particles in a residual mother liquor;
(iii) transferring the slurry to a hydrocyclone and separating the solid olefin polymerization catalyst component particles from the mother liquor using a hydrocyclone;
(iv) removing a by-product stream depleted in solid olefin polymerization catalyst component particles and a product stream enriched in solid olefin polymerization catalyst component particles from the hydrocyclone;
(v) transferring the product stream to a second vessel and in the presence of a washing medium forming a slurry and washing the particles with a washing medium e.g. by agitation thereof;
(vi) transferring the slurry to the hydrocyclone;
(vii) removing a second by-product stream depleted in solid olefin polymerization catalyst component particles and a second product stream enriched in solid olefin polymerization catalyst component particles from the hydrocyclone; optionally
(viii) washing the product stream enriched in solid olefin polymerization catalyst component particles with a second washing medium in a said first vessel;
(ix) separating the solid olefin polymerization catalyst component particles from the washing medium using the hydrocyclone.

More preferably, the invention provides a process for producing solid olefin polymerization Ziegler-Natta catalyst component particles free from an external carrier comprising the steps of:
a) providing a solution of at least one Group 2 metal compound, preferably at least one Group 2 metal alkoxide,
b) providing a solution of at least one compound of a transition metal of Group 4 to 10, preferably of transition metal of Group 4 to 6,
c) combining the solutions of step a) and step b) in a first vessel;
d) optionally adding an internal electron donor or precursor thereof at any step a) to c),
e) forming in said first vessel a slurry of solid Ziegler-Natta catalyst component particles in a residual mother liquor,
f) transferring said slurry to a hydrocylone and separating the solid olefin polymerization Ziegler-Natta catalyst component particles from the mother liquor;
g) removing a by-product stream depleted in solid olefin polymerization Ziegler-Natta catalyst component particles and a product stream enriched in solid olefin polymerization catalyst component particles from the hydrocyclone;

h) transferring the first product stream to a second vessel in the presence of a washing medium to form a slurry and washing the solid olefin polymerization catalyst component particles with said washing medium e.g. by agitation thereof;

i) transferring the slurry to the hydrocyclone;

j) removing a second by-product stream depleted in solid olefin Ziegler-Natta polymerization catalyst particles and a second product stream enriched in solid olefin Ziegler-Natta polymerization catalyst particles from the hydrocyclone; optionally k) washing the product stream enriched in solid olefin Ziegler-Natta polymerization catalyst particles with a second washing medium in a said first vessel;

l) separating the solid olefin polymerization catalyst component particles from the washing medium using the hydrocyclone.

The invention will now be descried with reference to the following non-limiting examples and figures.

In FIG. 1, solid olefin catalyst component particles are prepared in stirred tank reactor 1 following the protocol described in example 1. First washing medium is dosed into stirred tank reactor (2) and heated to the washing temperature.

The slurry of solid particles and at least a part of the liquid medium are transferred via lines 4 and 5 to hydrocyclone (3) where separation occurs. The bottom product stream enriched in catalyst particles is transferred from the hydrocylcone via lines 7 and 8 to reactor (2) and washed therein. Said stream (typically a slurry) is fed to the heated wash liquid in reactor (2). A stream depleted in catalyst particles is removed from the hydrocyclone via line 10 and taken to a storage vessel (not shown in the figure) for further treatments.

Whilst washing is taking place in reactor (2), a second washing medium is dosed into reactor (1) and heated to the washing temperature. The catalyst particles are separated from the first washing medium by transferring the slurry from reactor (2) via lines 6 and 5 back to the hydrocyclone (3). The bottom product stream from the hydrocyclone is then fed to reactor (I) via lines 7 and 9 where the second wash can be effected.

Whilst washing is taking place in reactor (1), a further washing medium is dosed into reactor (2) and heated. These pendulum washing steps between reactor (1) and (2) are repeated as many times as required.

Figure 2:
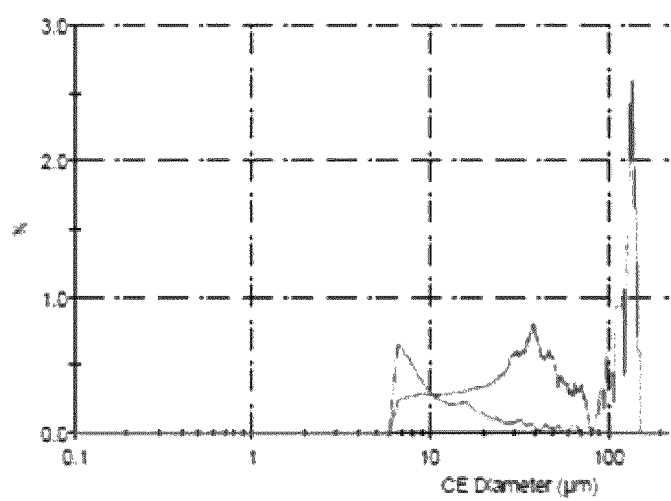

FIG. 2 shows volume transformation CE Diameter (µm) smoothed over 11 points for the catalyst component particles obtained in example 2.

Example 1

Preparation of ZN Catalyst by Emulsion-Solidification Method
Raw Materials
$TiCl_4$ (CAS 7550-45-90) was supplied by commercial source.
20% solution in toluene of butyl ethyl magnesium (Mg (Bu)(Et)), provided by Crompton
2-ethylhexanol, provided by Merck Chemicals
3-Butoxy-2-propanol, provided by Sigma-Aldrich
bis(2-ethylhexyl)citraconate, provided by Contract Chemicals
Viscoplex® 1-254, provided by Evonik
Heptane, provided by Chevron Preparation of Mg Complex
3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH was slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to storage vessel.

21.2 g of Mg alkoxide prepared above was mixed with 4.0 ml bis(2-ethylhexyl) citraconate for 5 min. After mixing the obtained Mg complex was used immediately in the preparation of catalyst component.

Preparation of Catalyst Component
19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 24.0 ml of heptane were added to form an emulsion. Mixing was continued for 30 minutes at 25° C. Then the reactor temperature was raised to 90° C. within 30 minutes. The reaction mixture was stirred for further 30 minutes at 90° C. In example 2 the use of hydrocyclone for separation of the solid from the mother liquid is described.

The solid material was washed with 100 ml of toluene, with 30 ml of TiCl4, with 100 ml of toluene and two times with 60 ml of heptane. Washings were made at 80° C. under stirring 30 min with 170 rpm. Washing steps were carried as described in example 3.

Catalyst slurry prepared according to the procedure as described above was transferred to a hydrocyclone.

Example 2

A hydrocyclone with cut size d50 of 13 µm was purchased from Krebs. The particles smaller than 13 µm substantially go to the waste stream from the top of the cyclone. A trial was executed using the hydrocyclone, which was connected to the catalyst preparation reactor unit 1 with connecting lines 4 and 5. Catalyst was prepared according to the procedure as described in example 1.

Separation in the hydrocyclone was effected in less than 25 minutes. Referring to the FIG. 1, in the hydrocyclone unit 3, the solid catalyst particles and liquid medium are separated by transferring the mixture from reactor 1 through the hydrocyclone. The bottom stream is removed from the hydrocyclone and transferred to reactor 2. Pressure difference between inlet-overhead was 0.7 bar.

The sampling showed cut size of being about the desired 13 µm (FIG. 2) when analysed using Malvern particle size analysis.

| Ex | Inlet pressure Bar | Total run time Min | catalyst slurry input density kg/m3 | overhead density kg/m3 | inlet flow rate kg/h | overhead flow rate kg/h |
|---|---|---|---|---|---|---|
| 2a | 1 | 22 | 926 | 860 | 212 | 61 |
| 2b | 1 | 15 | 928 | 859 | 245 | 171 |
| 2c | 1 | 17 | 927 | 868 | 236 | 117 |

Example 3—Washing of the Solid Particles

In example 3, the solid catalysts particles are prepared according to the procedure as described in example 1. They are then subject to a first hydrocyclone separation as described in example 2. As further illustrated in FIG. 1, catalyst was prepared in reactor 1 and at the same time toluene wash liquid was dosed to the reactor 2 and heated up to required washing temperature, where upon a $1^{st}$ toluene wash is performed due to the presence of the toluene within reactor 2.

Overhead flow from the hydrocyclone, which is primarily mother liquor, is directed to waste. Separation/Concentration efficiency is adjusted by controlling the hydrocyclone split (overhead flow fraction of the inlet flow) by flow measurements and control valves.

After the $1^{st}$ toluene wash is complete in reactor 2, catalyst slurry is concentrated again by transferring it through the hydrocyclone 3. Washing solvent can be removed overhead and sent to waste. Bottom particles are recovered and subjected to a second washing step.

The second washing step takes place in reactor 1. This "Pendulum" washing sequence is repeated for the following heptane washing steps. Each washing step can take roughly 10 to 15 minutes. On industrial scale, typically it takes 30-60 minutes to heat up sufficient washing liquid to the target temperature (50-120° C.). One washing step can therefore last 50-65 minutes. The total time for e.g. six washes was only 4-6 hours in comparison to the previous 20 hours when settling is required after each step.

The invention claimed is:

1. A process for washing a particulate substance comprising:
   (i) combining a particulate substance and a first washing medium in a first vessel to form a slurry and washing the particulate substance with said washing medium;
   (ii) transferring the slurry to a hydrocyclone;
   (iii) removing a first by-product stream depleted in particulate substance and a first product stream enriched in particulate substance from the hydrocyclone;
   (iv) transferring the first product stream to a second vessel and in the presence of a second washing medium forming a slurry and washing the particulate substance with said second washing medium;
   (v) transferring the slurry back to the hydrocyclone;
   (vi) removing a second by-product stream depleted in particulate substance and a second product stream enriched in particulate substance from the hydrocyclone.

2. A process for separating solid olefin catalyst component particles from a medium in which they are present which process comprises:
   (i) providing in a first vessel a slurry of a liquid medium and solid olefin catalyst component particles;
   (ii) transferring the slurry into a hydrocyclone;
   (iii) removing a first by-product stream depleted in solid olefin polymerization catalyst component particles and a first product stream enriched in solid olefin polymerization catalyst component particles from the hydrocyclone;
   (iv) transferring the first product stream to a second vessel and in the presence of a washing medium to form a slurry and washing the solid olefin polymerization catalyst component particles with said washing medium;
   (v) transferring the slurry back to the hydrocyclone;
   (vi) removing a second by-product stream depleted in solid olefin polymerization catalyst component particles and a second product stream enriched in solid olefin polymerization catalyst component particles from the hydrocyclone.

3. The process as claimed in claim 1 further comprising:
   (vii) transferring the second product stream to said first vessel and in the presence of a washing medium to form a slurry and washing the particulate substance or solid olefin polymerization catalyst component particles with said washing medium;
   (viii) transferring the slurry back to the hydrocyclone;
   (ix) removing a third by-product stream depleted in particulate substance and a third product stream enriched in particulate substance from the hydrocyclone;
   (x) optionally repeating steps (iv) to (vi) or steps (iv) to (ix) until the washing process is complete.

4. The process as claimed in claim 1 wherein the hydrocyclone comprises an outlet for removal of the by-product stream, an outlet for removal of the product stream and a separate inlet for supplying the slurry to the hydrocyclone in such a way to create a vortex within the hydrocyclone.

5. The process as claimed in claim 1 comprising removal of a by-product stream via an overhead outlet and removal of a product stream via a bottom outlet, if the by-product stream has a lower density than said product stream, or removal of the by-product stream via bottom outlet and removal of the product stream via overhead outlet, if the by-product stream has a higher density than the product stream.

6. The process as claimed in claim 1 wherein the particulate substance is solid olefin catalyst component particles.

7. The process as claimed in claim 2 wherein the solid olefin catalyst component particles comprise supported Ziegler-Natta or supported single-site catalyst component particles or a solid Ziegler-Natta catalyst or solid single-site catalyst component particles without any external carrier material.

8. The process as claimed in claim 7 wherein the solid olefin catalyst component particles are Ziegler-Natta catalyst particles comprising Mg, Ti and an optional internal electron donor, or precursors thereof.

9. The process as claimed in claim 1 wherein the size cut off in the hydrocyclone is 5 to 50 µm.

10. The process as claimed in claim 1 wherein the particulate substance or solid olefin catalyst component particles have a volumetric mean particle size of 5 to 400 µm.

11. The process as claimed in claim 1 wherein the washing medium is fed to the second vessel before the product stream is fed into the second vessel and the washing medium is heated while the particulate substance is washed in the first vessel and/or whilst the solid olefin catalyst component particles are prepared in the first vessel.

12. The process as claimed in claim 1 wherein the first and second vessels are stirred tank reactors and washing is carried out via stirring the slurry.

13. The process as claimed in claim 1 wherein there are 3 or more washing steps.

14. The process as claimed in claim 1 wherein the washing medium in each step is the same or different and comprises a hydrocarbon solvent or a liquid titanium tetrachloride solution or mixtures thereof.

15. The process as claimed in claim 1 wherein any product stream enriched in particulate substance comprises 4 to 20 wt-% of said particulate substance.

16. The process as claimed in claim 1 wherein the first washing step (i) temperature is in the range of 20 to 120° C.

17. The process as claimed in claim 2, wherein the solid olefin catalyst component particles of step (i) are formed by producing in the first vessel an emulsion comprising droplets of a dispersed phase in a continuous phase, the droplets comprising a transition metal compound; and then solidifying the droplets to provide in the first vessel the slurry;

wherein in step (ii), the solid olefin polymerization catalyst component particles are separated from the liquid medium using the hydrocyclone;

wherein after step (vi), the method further comprises:

(vii) washing the product stream enriched in solid olefin polymerization catalyst component particles with a second washing medium in a said first vessel; and (viii) separating the solid olefin polymerization catalyst component particles from the washing medium using the hydrocyclone.

18. The process as claimed in claim 2 wherein the solid olefin catalyst component particles of step (i) are formed by a) providing a solution of at least one Group 2 metal compound, b) providing a solution of at least one compound of a transition metal of Group 4 to 10, c) combining the solutions of step a) and step b) in the first vessel;

d) optionally adding an internal electron donor or precursor thereof at any step a) to c), i) wherein the slurry is a slurry of solid Ziegler-Natta catalyst component particles in the liquid medium, wherein in step (ii)

ii) the solid olefin polymerization Ziegler-Natta catalyst component particles are separated from the liquid medium;

wherein after step (vi), the method further comprises:

vii) washing the product stream enriched in solid olefin Ziegler-Natta polymerization catalyst particles with a second washing medium in a said first vessel; and viii) separating the solid olefin Ziegler-Natta polymerization catalyst component particles from the washing medium using the hydrocyclone.

19. The process as claimed in claim 18 wherein in step a) the Group 2 metal compound is a Group 2 metal alkoxide, and in step b) the solution comprises at least one compound of a transition metal of Group 4 to 6.

* * * * *